(12) United States Patent
Lambert

(10) Patent No.: US 7,928,625 B2
(45) Date of Patent: Apr. 19, 2011

(54) STATOR BAR WITH END ARM INVOLUTE-ON-CONE BEND SUBSTANTIALLY ALIGNED WITH STATOR CORE SLOT

(75) Inventor: James Oldham Lambert, Roswell, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/388,687

(22) Filed: Feb. 19, 2009

(65) Prior Publication Data

US 2010/0207481 A1    Aug. 19, 2010

(51) Int. Cl.
*H02K 3/04* (2006.01)
*H02K 1/12* (2006.01)
*H02K 3/46* (2006.01)

(52) U.S. Cl. ..... 310/201; 310/202; 310/203; 310/254.1; 310/260; 310/270

(58) Field of Classification Search .................. 310/260, 310/58, 254.1, 201–203, 270
See application file for complete search history.

(56) References Cited

U.S. PATENT DOCUMENTS

| | | | | |
|---|---|---|---|---|
| 2,602,829 A | * | 7/1952 | Fromm et al. | 310/260 |
| 3,348,085 A | * | 10/1967 | Coggeshall et al. | 310/260 |
| 4,278,905 A | * | 7/1981 | Chari et al. | 310/52 |
| 7,216,796 B2 | * | 5/2007 | Breznak et al. | 228/245 |

FOREIGN PATENT DOCUMENTS

JP      54023913 A  *  2/1979

OTHER PUBLICATIONS

Derwent Translation Abstract JP54023913 (1979).*

* cited by examiner

*Primary Examiner* — Quyen Leung
*Assistant Examiner* — Jose A Gonzalez Quinones
(74) *Attorney, Agent, or Firm* — Hoffman Warnick LLC; Ernest G. Cusick

(57) ABSTRACT

Dynamoelectric device and stator bar therefor, where the stator bar includes a linear portion for positioning in a slot of a stator core, the slot extending in a radial direction relative to an axis of the stator, and an end arm portion having an involute-on-cone bend relative to the linear portion and an elongated cross-section that is substantially aligned with the radial direction of the slot.

12 Claims, 8 Drawing Sheets

US 7,928,625 B2

STATOR BAR WITH END ARM INVOLUTE-ON-CONE BEND SUBSTANTIALLY ALIGNED WITH STATOR CORE SLOT

BACKGROUND OF THE INVENTION

The invention relates generally to dynamoelectric devices such as generators and large motors. More particularly, the invention relates to a dynamoelectric device having a stator bar with an end arm involute portion substantially aligned with a stator core slot and a related method.

Referring to FIG. 1, portions of a stator 100 and a rotor 102 of a conventional dynamoelectric device in the form of a generator 104 are illustrated. Rotor 102 may include any now known or later developed rotor structure. Stator 100 includes a stator core 110 including a plurality of layered punchings 112. As known in the art, stator core 110 includes a number of circumferentially arranged slots 114 that extend in a radial direction relative to an axis Z of stator 100. Each slot 114 has a pair of stator bars 120 positioned radially therein. Stator bars 120 are conductive, metal bars that are covered with a dielectric, and are coupled together so as to create an electrical winding circuit. Each stator bar 120 includes a linear portion 122 for positioning in a slot 114 of stator core 110 and an end arm portion 130 that extends outwardly past stator core 110 and slots 114 to form an endwinding region 128.

Referring to FIGS. 2-3, enlarged perspective views of end winding region 128 of generator 104 (FIG. 1) are illustrated. As shown, each stator bar 120 (FIG. 1) has an elongated cross-section, e.g., substantially rectangular, or oblong, etc. Further, each end arm portion 130 includes an involute-on-cone bend 132 relative to linear portion 122. The involute portion is typically represented by an equivalent radius. That is, end arm portion 130 extends outwardly so as to form a cone shape (actually frusto-conical shape) when juxtaposed with other end arm portions, and extends circumferentially in one direction so as to form an involute portion relative to linear portion 122. Bend 132 is provided such that an end 140 of a stator bar 120 is positioned, for example, approximately 60 to 80 degrees away from slot 114 (FIG. 1), which permits connection of stator bar 120 (FIG. 1) to a radially adjacent stator bar 142 so as to continue the electrical winding circuit.

During assembly, each stator bar 120 (FIG. 1) is positioned relative to adjacent stator bar(s) by radially moving it into a slot 114 (FIG. 1). However, where previous stator bars have been positioned, sides of end arm portions 130 interfere with adjacent end arm portions 130 in involute-on-cone bend 132 during assembly. In order to address this issue, assemblers must flex and stress end arm portions 130, which some times leads to dielectric test failures that require replacement of the failed stator bar.

FIGS. 3-5 illustrate the problem at four locations A-D along an end arm portion 130 of a stator bar 120A to be positioned relative to an end arm portion 130 of an already positioned stator bar 120B (120B and 120C in FIG. 4). In particular, FIG. 4 shows how a linear portion 122 of a stator bar 120 (FIG. 1) is positioned to slide into slot 114, while involute-on-cone bend 132 at positions B or C, as shown in FIG. 3, are positioned so as to be perpendicular to a cone shape 144 (shown as line in FIG. 4) formed by end arm portions 130. As stator bar 120A moves along radial direction of travel X at linear portion 122 at position A so as to slide into slot 114, involute-on-cone bend 132 at position B or C interferes with adjacent stator bar 120B (in circle). FIG. 5 shows a schematic cross-sectional view of a pair of end arms 120A, 120B at all locations A-D as denoted in FIG. 3. In FIG. 5, the initial position of stator bar 120A to be positioned is shown in phantom, while the final position is shown in solid line. At position A, near linear portion 122, as in FIG. 4, stator bar 120A to be positioned relative to an already positioned stator bar 120B can be easily positioned into slot 114 (not shown) without interfering with stator bar 120B. At positions B and C, however, stator bar 120A interferes with already positioned stator bar 120B (in circles) as the stator bar moves along radial direction of travel X. At position D, no interference may be present or is less of a concern due to increased allowable flex.

BRIEF DESCRIPTION OF THE INVENTION

A first aspect of the disclosure provides a stator bar for a stator of a dynamoelectric device, the stator bar comprising: a linear portion for positioning in a slot of a stator core, the slot extending in a radial direction relative to an axis of the stator; and an end arm portion having an involute-on-cone bend relative to the linear portion and an elongated cross-section that is substantially aligned with the radial direction of the slot.

A second aspect of the disclosure provides a dynamoelectric device comprising: a rotor; a stator including a stator bar for a stator of the dynamoelectric device, the stator bar including: a linear portion for positioning in a slot of a stator core, the slot extending in a radial direction relative to an axis of the stator; and an end arm portion having an involute-on-cone bend relative to the linear portion and an elongated cross-section that is substantially aligned with the radial direction of the slot.

DETAILED DESCRIPTION OF THE INVENTION

Figure 6:
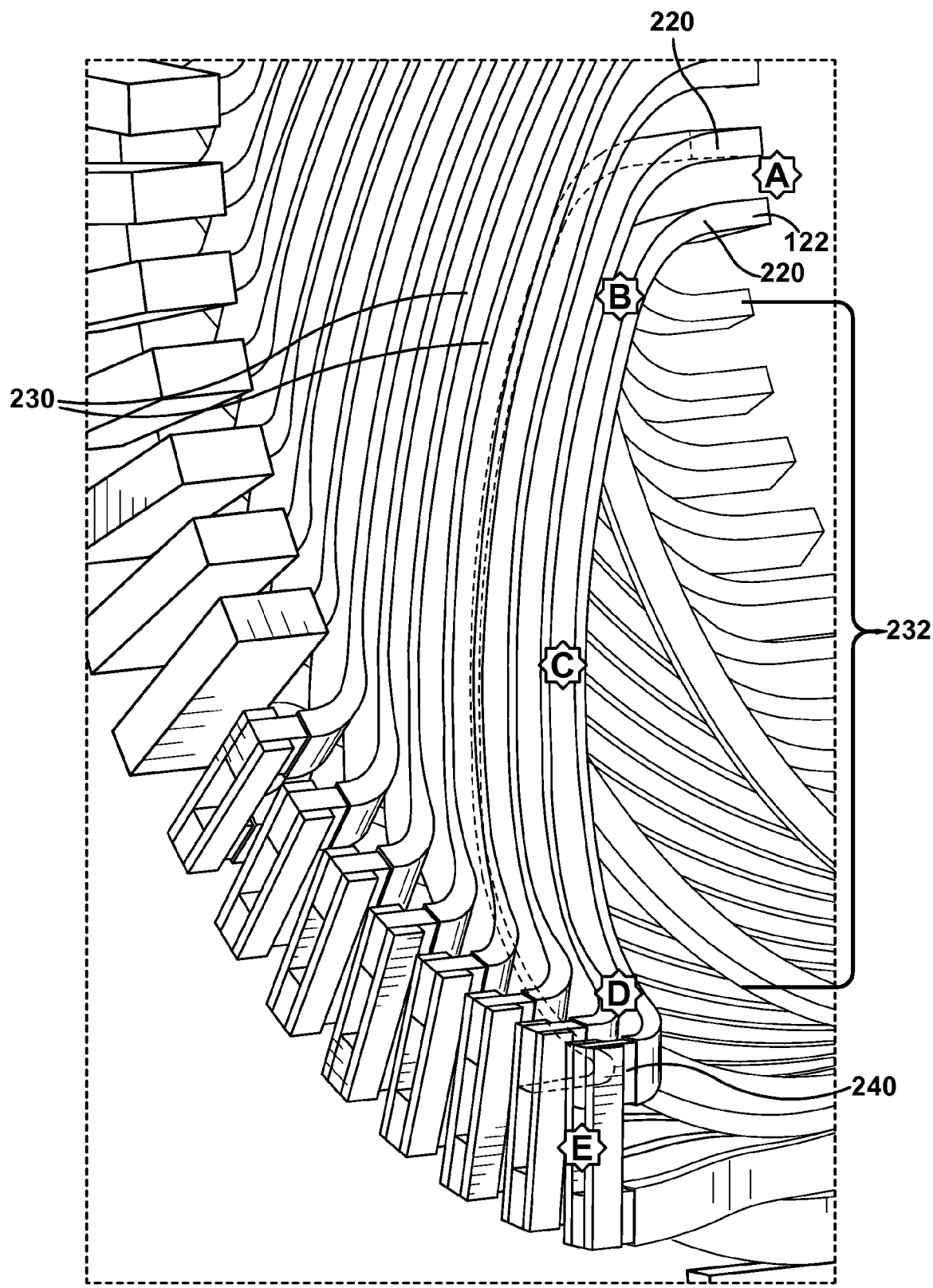
FIG. 6 shows an enlarged perspective view of an involute-on-cone portion of the end arm portion according to embodiments of the invention.
Figure 7:
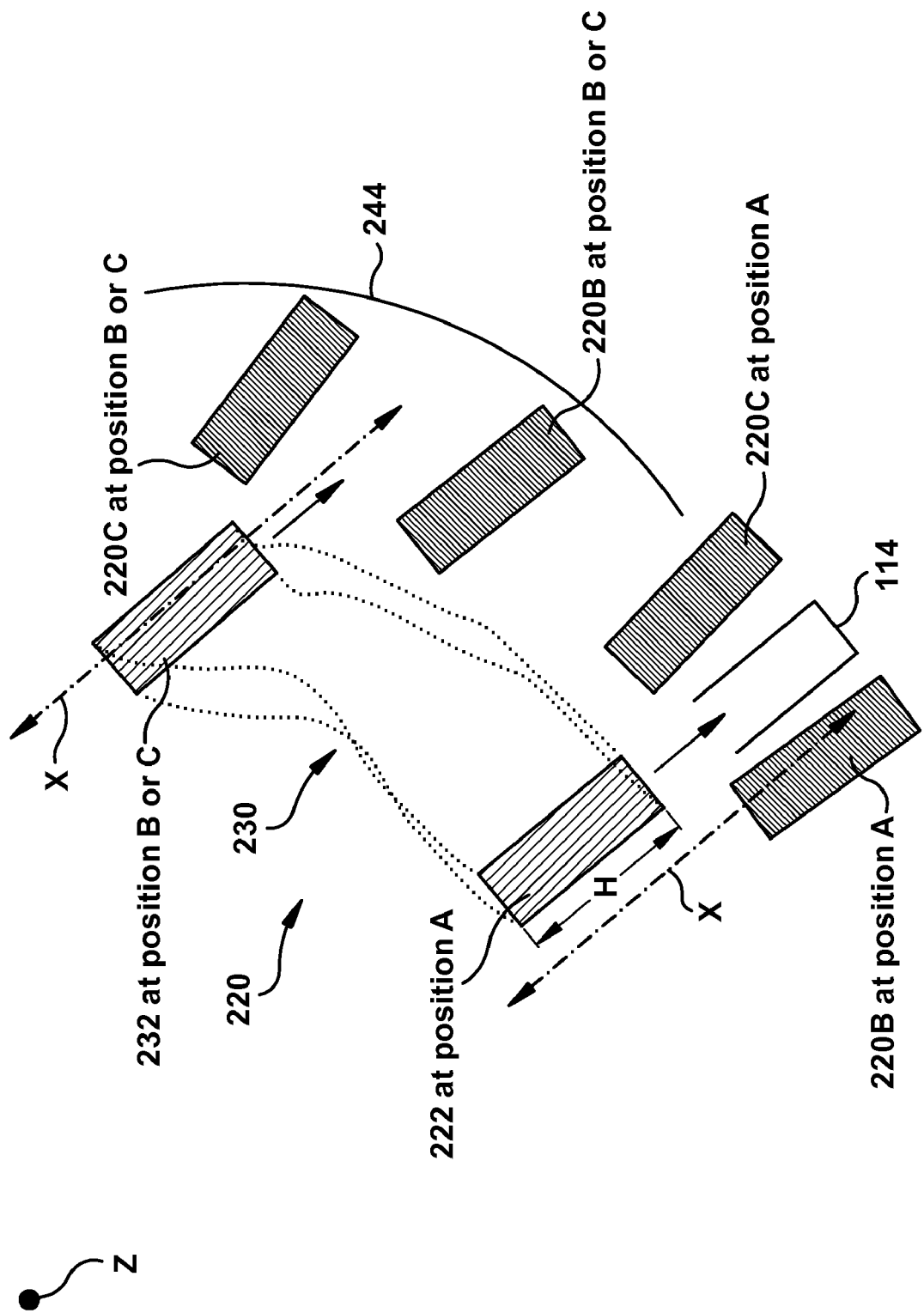
FIG. 7 shows cross-sectional views of the end arm portion at the stator slot position and at a location along the involute portion of the end arm portion according to embodiments of the invention.
Figure 8:
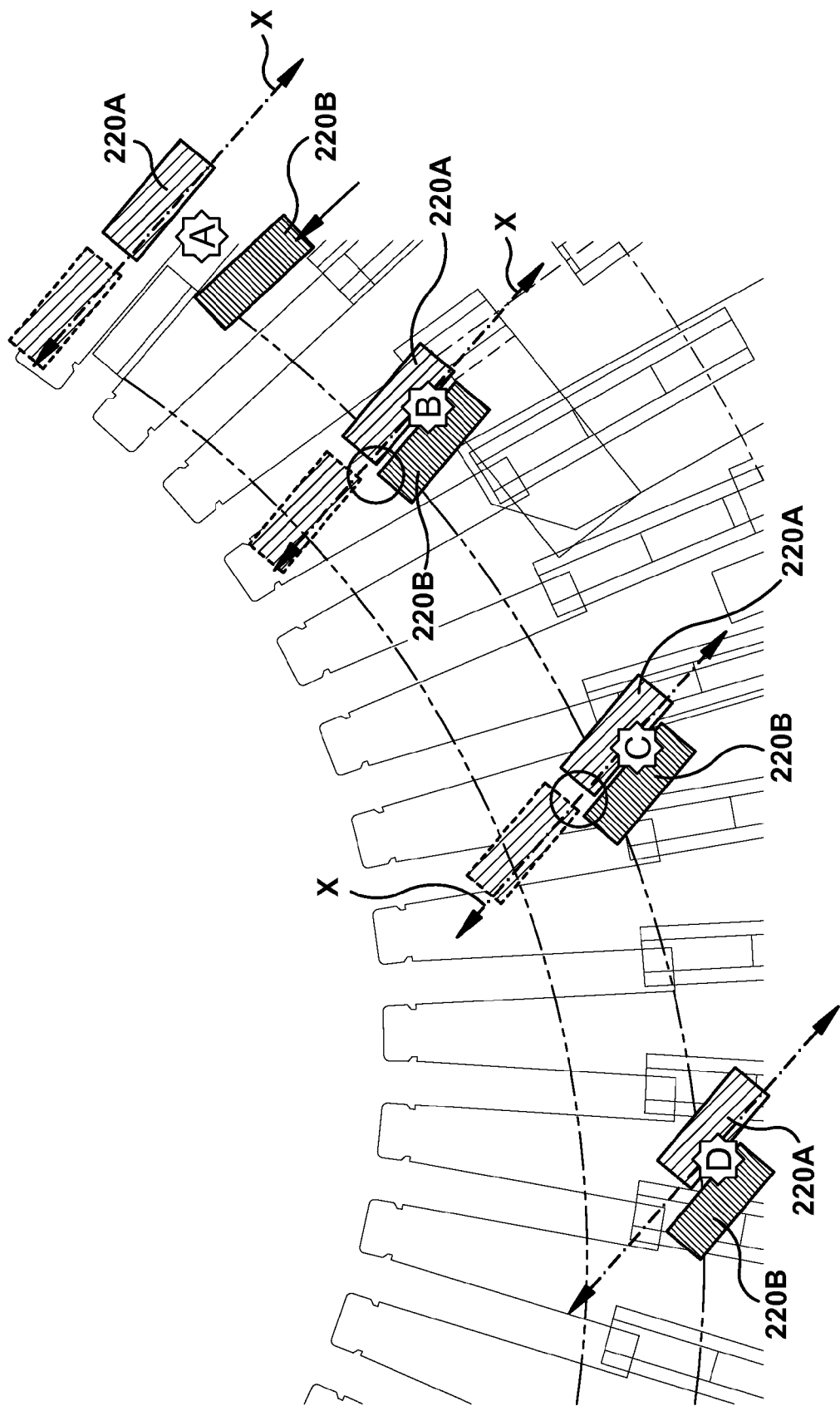
FIG. 8 shows a schematic cross-sectional view of a pair of end arm portions at locations A-D as denoted in FIG. 6.

Referring to FIGS. 6-8, a stator bar 220 according to embodiments of the invention is illustrated. Although embodiments of the invention are illustrated relative to a dynamoelectric device in the form of a generator, it is understood that the teachings are equally applicable to other dynamoelectric devices such as large motors. FIGS. 6 and 8 illustrate stator bar 220 at locations A-D along an end arm portion 230 of a stator bar 220A to be positioned relative to an end arm portion 230 of an already positioned stator bar 220B (220B and 220C in FIG. 7). FIG. 7 shows cross-sectional views of end arm portion 230 at the stator slot position A and at a location along the involute portion of end arm portion 230. In one embodiment, stator bar 220 may include a solid material such as copper with an insulative layer of fiberglass and mica adhered to the copper, and may have a radial height (H) (FIG. 7) in the range of 1.5 to 4.5 inches with an aspect ratio in the range of 1 to 6.

Figure 1:
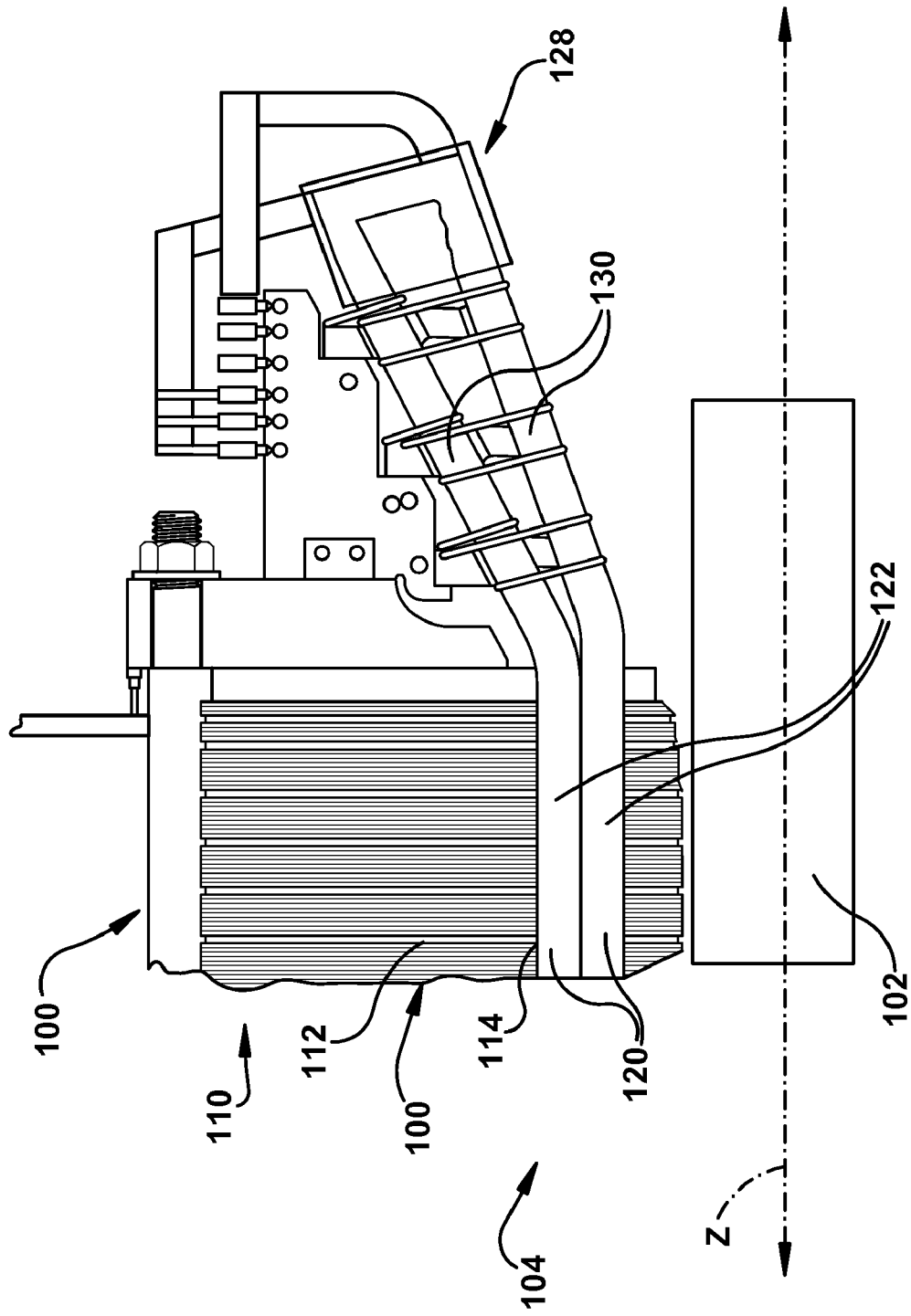
FIG. 1 shows a partial cross-sectional view of a conventional generator near an end thereof.
Figure 2:
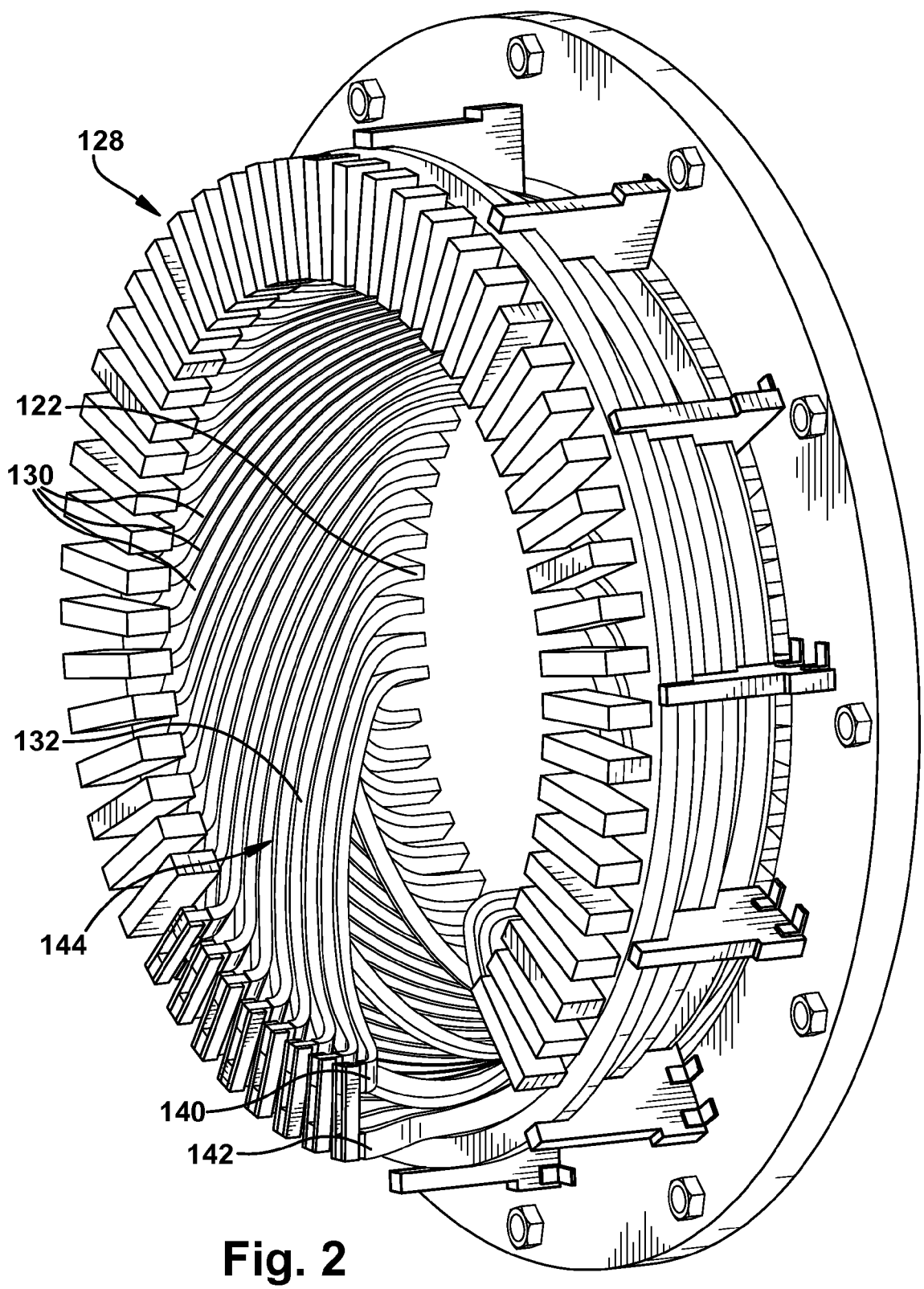
FIG. 2 shows a perspective view of an end arm portion of the conventional generator of FIG. 1.
Figure 3:
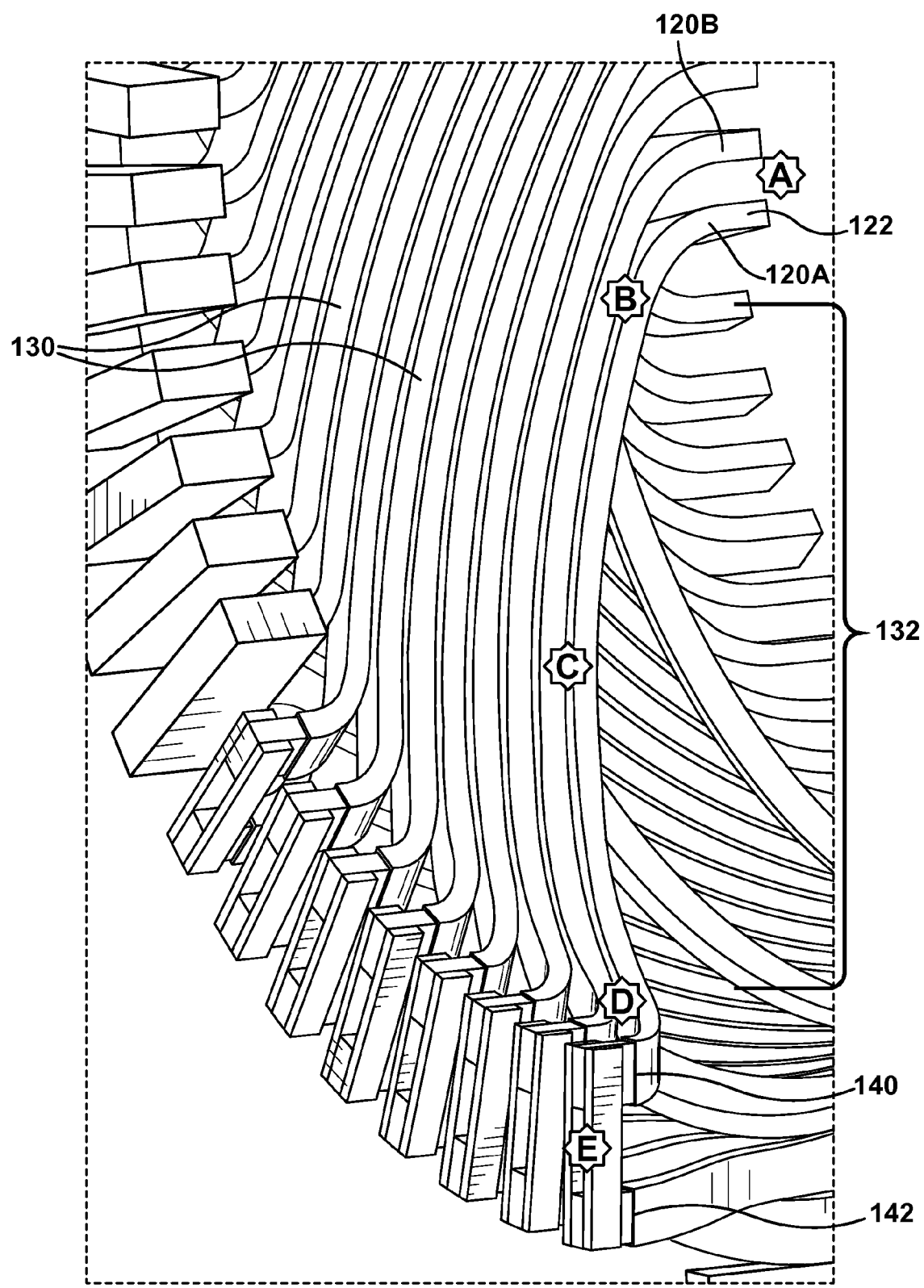
FIG. 3 shows an enlarged perspective view of an involute-on-cone portion of the end arm portion of FIG. 2.
Figure 4:
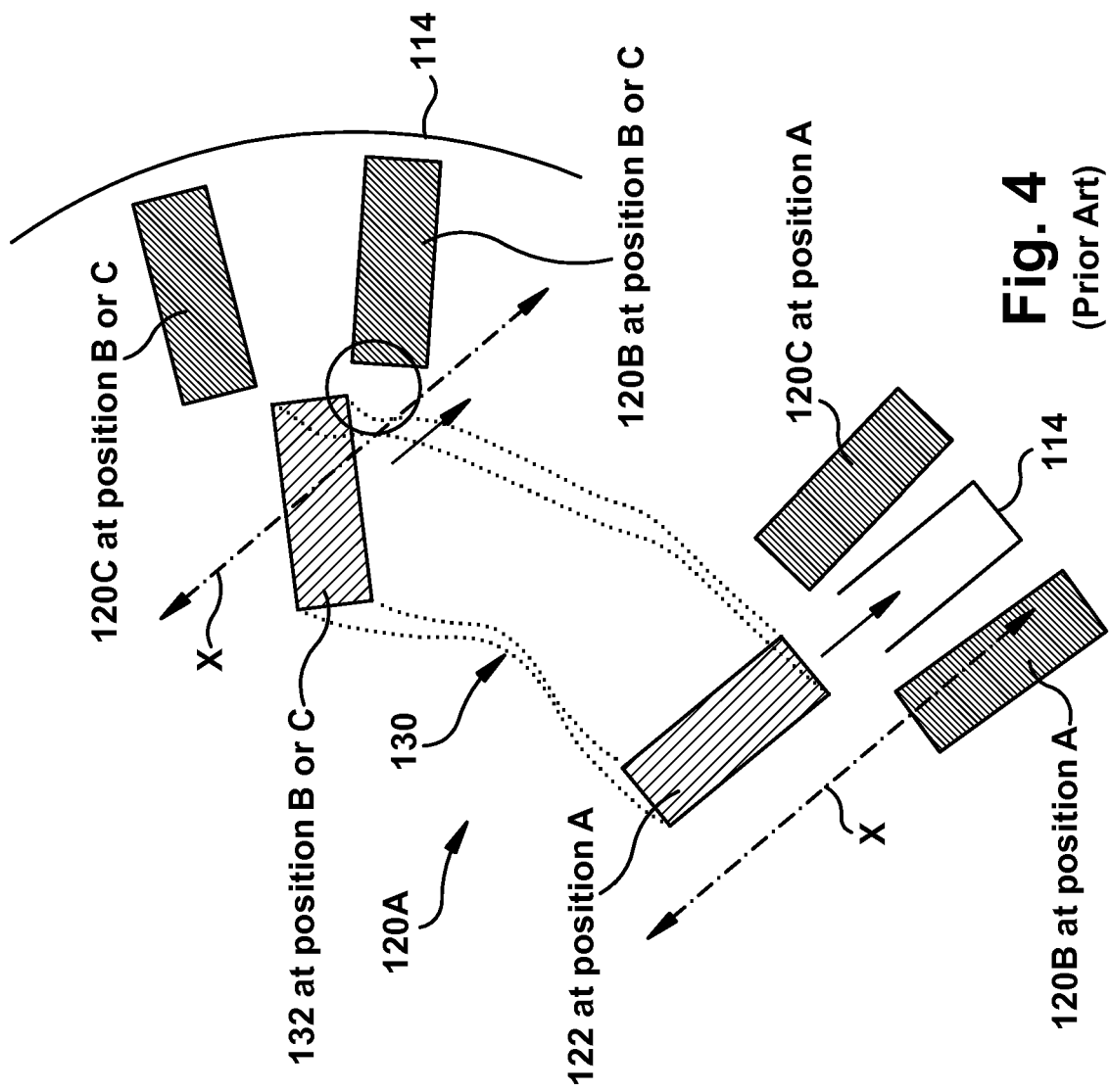
FIG. 4 shows cross-sectional views of the end arm portion at the stator slot position and at location(s) along the involute portion of the end arm for a conventional generator.
Figure 5:
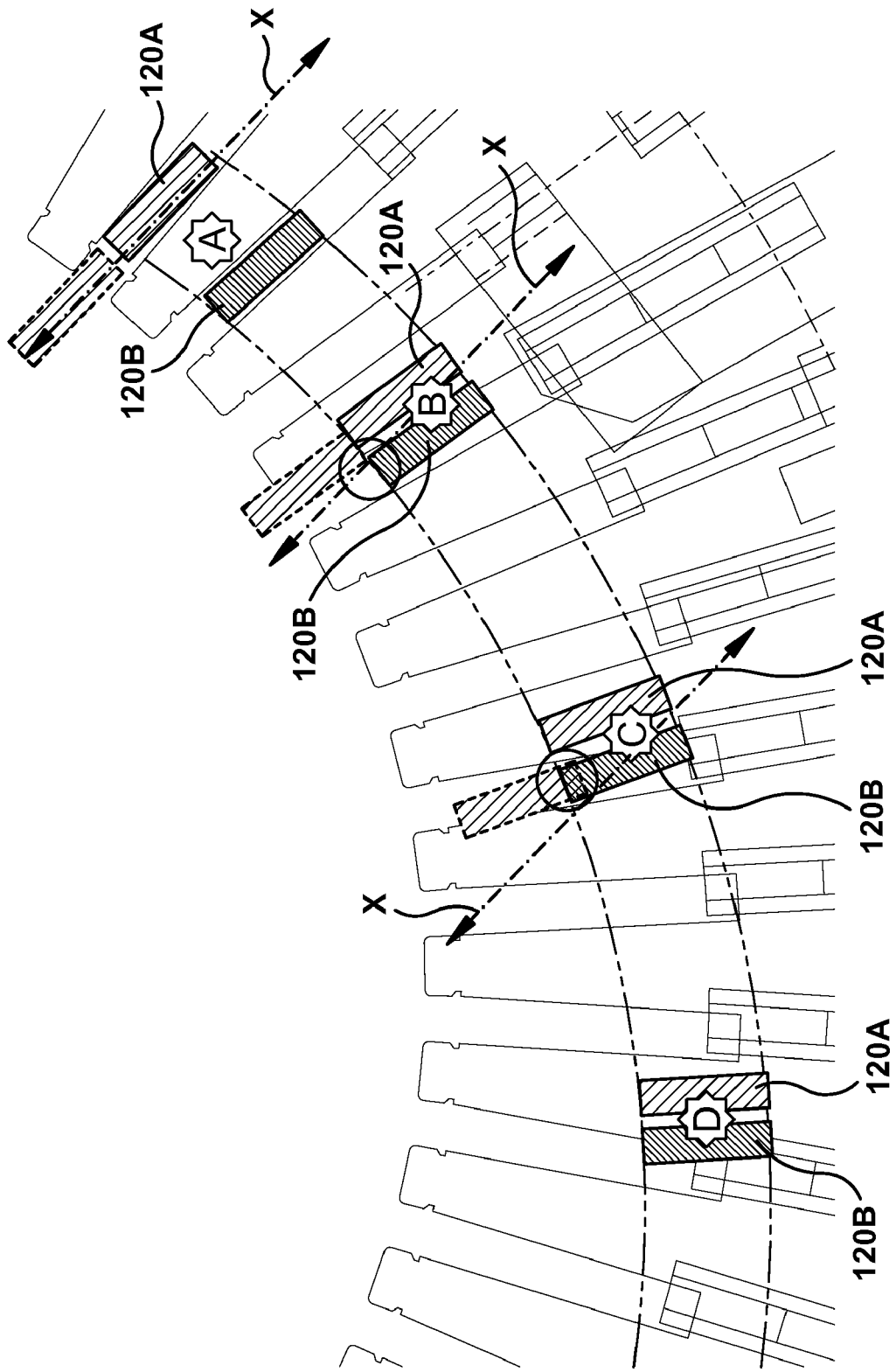
FIG. 5 shows a schematic cross-sectional view of a pair of end arms at locations A-D as denoted in FIG. 3.

In one embodiment, stator bar 220 includes a linear portion 222 for positioning in slot 114 of stator core 110 (FIG. 1). As noted herein, and as shown in FIG. 7, slot 114 extends in a radial direction relative to an axis Z of stator 100 (FIG. 1). As shown best in FIGS. 6 and 7, in contrast to conventional stator bars, an end arm portion 230 includes an involute-on-cone bend 232 relative to linear portion 222 and an elongated cross-section that is substantially aligned with the radial direction of slot 114. That is, involute-on-cone bend 232 is positioned so as not to be perpendicular to a cone shape 244 (shown as line in FIG. 7) formed by end arm portions 230, but parallel to linear portion 222. Consequently, as shown best in FIG. 7, during assembly, each stator bar 220 is positioned relative to adjacent stator bar(s) 220B, 220C by radially moving it into a slot 114. Where previous stator bars have been positioned, sides of end arm portions 230 interference with adjacent end arm portions 230 in involute-on-cone bend 232 is minimized because the bend is substantially aligned (i.e., aligned or offset so as to be substantially parallel) with the radial direction of travel upon which it must move. Since adjacent stator bars 220B, 220C are similarly angled, the amount of flex and stress that assemblers must exert on end arm portions 230 may be drastically reduced or eliminated. In addition, in one embodiment, the alignment allows for a reduced spacing between adjacent stator bars 220, for example, to approximately 0.125 inches. Bend 232 may be provided such that an end 240 of stator bar 220 is positioned, for example, approximately 60 to 80 degrees away from slot 114, which permits connection of stator bar 220 to a radially adjacent stator bar so as to continue the electrical winding circuit.

FIG. 8 shows a schematic cross-sectional view of a pair of end arms 220A, 220B at all locations A-D as denoted in FIG. 6. In FIG. 8, the initial position of stator bar 220A to be positioned is shown in phantom, while the final position is shown in solid line. In contrast to conventional stator bar 120 (FIGS. 1-5), at all positions A-D, stator bar 220A can be easily positioned with little or no interference as stator bar 220A moves along radial direction of travel X. This is the case regardless of whether positioning of stator bar 220A into slot 114 (not shown) is observed at position A, along bend 232 at positions B or C, or at an end 240 at position D. Furthermore, this is the case regardless of whether stator bar 220 is being initially placed during construction of generator 104 (FIG. 1) or stator bar 220 is being removed for maintenance or replacement. That is, stator bar 220 can move into or out of the stator core 110 (FIG. 1) by moving linear portion 222 into or out of slot 114, respectively, along a radial direction of travel, and end arm portion 230 will move parallel to the direction of travel X so as to be positioned between adjacent end arm portions.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A stator bar for a stator of a dynamoelectric device, the stator bar comprising:
    a linear portion for positioning in a slot of a stator core, the slot extending in a radial direction relative to an axis of the stator; and
    an end arm portion having an involute-on-cone bend substantially parallel to the linear portion and an elongated cross-section that is substantially aligned with the radial direction of the slot.

2. The stator bar of claim 1, wherein the elongated cross-section is substantially rectangular.

3. The stator bar of claim 1, wherein the stator bar includes a solid material.

4. The stator bar of claim 3, wherein the elongated cross-section has a radial height in a range of approximately 1.5 to 4.5 inches.

5. The stator bar of claim 4, wherein the elongated cross-section has an aspect ratio of approximately 1 to 6.

6. A dynamoelectric device comprising:
    a rotor;
    a stator including a stator bar for a stator of the dynamoelectric device, the stator bar including:
    a linear portion for positioning in a slot of a stator core, the slot extending in a radial direction relative to an axis of the stator; and
    an end arm portion having an involute-on-cone bend substantially parallel to the linear portion and an elongated cross-section that is substantially aligned with the radial direction of the slot.

7. The dynamoelectric device of claim 6, wherein the elongated cross-section is substantially rectangular.

8. The dynamoelectric device of claim 6, wherein the stator bar includes a solid material.

9. The dynamoelectric device of claim 8, wherein the elongated cross-section has a radial height in a range of approximately 1.5 to 4.5 inches.

10. The dynamoelectric device of claim 9, wherein the elongated cross-section has an aspect ratio of approximately 1 to 6.

11. The dynamoelectric device of claim 6, further comprising a plurality of adjacent stator bars, wherein a spacing between adjacent stator bars is approximately 0.125 inches.

12. The dynamoelectric device of claim 6, further comprising a plurality of adjacent stator bars adjacent to the stator bar, wherein the end portion of the stator bar and an end portion of each of the plurality of adjacent stator bars form a cone shape, and wherein the involute-on-cone bend is positioned not substantially perpendicular to the cone shape.

* * * * *